(12) United States Patent
Jain et al.

(10) Patent No.: US 11,676,507 B2
(45) Date of Patent: **\*Jun. 13, 2023**

(54) FOOD DESCRIPTION PROCESSING METHODS AND APPARATUSES

(71) Applicant: MYFITNESSPAL, INC., San Francisco, CA (US)

(72) Inventors: Aadhar Jain, San Francisco, CA (US); Chul Lee, San Francisco, CA (US); Bryan Levine, San Francisco, CA (US)

(73) Assignee: MyFitnessPal, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,237

(22) Filed: Dec. 20, 2021

(65) Prior Publication Data

US 2022/0114913 A1 Apr. 14, 2022

Related U.S. Application Data

(63) Continuation of application No. 16/747,229, filed on Jan. 20, 2020, now Pat. No. 11,238,753, which is a (Continued)

(51) Int. Cl.
*G09B 19/00* (2006.01)
*G06F 16/22* (2019.01)

(52) U.S. Cl.
CPC ......... *G09B 19/0092* (2013.01); *G06F 16/22* (2019.01)

(58) Field of Classification Search
CPC ...................................................... G06F 16/22
See application file for complete search history.

(56) References Cited

U.S. PATENT DOCUMENTS 6,478,736 B1 * 11/2002 Mault ................. G16H 15/00
600/300
7,574,426 B1 * 8/2009 Ortega ............... G06F 16/3329
(Continued)

FOREIGN PATENT DOCUMENTS

JP 2010128771 A * 6/2010
JP 2010128771 A 6/2010

OTHER PUBLICATIONS

JPO English Language Translation of Kawaguchi (Year: 2010).*

*Primary Examiner* — Apu M Mofiz
*Assistant Examiner* — Farhad Agharahimi
(74) *Attorney, Agent, or Firm* — Maginot, Moore & Beck, LLP

(57) ABSTRACT

Disclosed embodiments include apparatuses, methods and storage media associated with modifying a food record database. The method comprises receiving a plurality of food records from a plurality of sources, each of the plurality of food records comprising at least a food record description, the plurality of sources including (i) at least one non-user entity that is an owner of a third party food database and (ii) users of the food record database. The method further comprises receiving search requests from users, and returning one or more top search results from the food record database in response. The method also comprises determining a score for a particular food record identified by the top search results, wherein the score is calculated based at least in part on one of: a number of times the particular food record has been included in the top search results of the search requests or a number of times the particular food record has been logged.

20 Claims, 7 Drawing Sheets

Related U.S. Application Data continuation of application No. 14/480,401, filed on Sep. 8, 2014, now Pat. No. 10,559,223.

(56) References Cited

U.S. PATENT DOCUMENTS

| | | | | |
|---|---|---|---|---|
| 7,966,291 | B1* | 6/2011 | Petrovic | G06F 16/951 |
| | | | | 707/641 |
| 2004/0194141 | A1* | 9/2004 | Sanders | H04N 5/44543 |
| | | | | 725/53 |
| 2006/0136462 | A1* | 6/2006 | Campos | G06F 16/2465 |
| 2007/0118405 | A1* | 5/2007 | Campbell | A61B 5/14532 |
| | | | | 705/2 |
| 2008/0040313 | A1* | 2/2008 | Schachter | G06F 16/9562 |
| 2008/0091705 | A1* | 4/2008 | McBride | G06F 19/3475 |
| 2009/0099873 | A1* | 4/2009 | Kurple | G06Q 50/24 |
| | | | | 705/3 |
| 2009/0271420 | A1* | 10/2009 | Kusui | G06F 16/285 |
| 2010/0005048 | A1* | 1/2010 | Bodapati | G06F 16/20 |
| | | | | 706/47 |
| 2010/0169361 | A1* | 7/2010 | Chen | G06F 16/285 |
| | | | | 707/769 |
| 2011/0119161 | A1* | 5/2011 | Van Treeck | G06Q 30/02 |
| | | | | 705/27.2 |
| 2012/0005222 | A1* | 1/2012 | Bhagwan | G06K 9/18 |
| | | | | 707/769 |
| 2012/0023107 | A1* | 1/2012 | Nachnani | G06F 16/24532 |
| | | | | 707/748 |
| 2015/0199744 | A1* | 7/2015 | Tolvanen | G06Q 30/0631 |
| | | | | 707/737 |

* cited by examiner

FOOD DESCRIPTION PROCESSING METHODS AND APPARATUSES

CROSS-REFERENCE TO RELATED APPLICATIONS

This application is a continuation of U.S. patent application Ser. No. 16/747,229, filed Jan. 20, 2020, which is a continuation of U.S. patent application Ser. No. 14/480,401, filed Sep. 8, 2014, both also entitled "Food Description Processing Methods and Apparatuses," the entire contents of which are incorporated by reference herein.

FIELD

The present disclosure relates to the field of data processing. More particularly, the present disclosure relates to food description processing.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Historically, when gathering data from multiple sources either the various sources may need to be aware of any formatting requirements there may be for the data, or the entity performing the gathering may need to know how the data is formatted in the individual sources. If neither of the above is the case, the entity gathering the data may be limited as to how the data may be able to be utilized. Such a scenario may be exacerbated by the collection of data from users where any number of users may enter data and the users may not know, or really even care, what format the data is to be entered in. So long as the data serves the individual user's purpose, the user may be satisfied. Specifically, in scenarios where the data may concern descriptions of foods, including nutritional information, the data entered by various users may vary dramatically. As a result, an entity wishing to utilize the user entered data may have to manually modify individual user entries to conform to the desired data format or may have to live with the format of the data as the user entered it.

SUMMARY

In at least one embodiment, a system comprises database having a plurality of food records including (i) one or more official food records comprising data obtained from a third party food database, and (ii) one or more food records comprising data provided by users of the system, wherein each of the food records comprises at least a description of a food item. The system further comprises one or more processors and a food data processing engine. When operated by the one or more processors, the food data processing engine amends at least one of the food records in the database by causing the system to standardize the at least one food item description of the at least one food record, and determine a score associated with the at least one food record, wherein the score is calculated based at least in part on one of: a number of times the at least one food record has been logged or a number of times the at least one food record appeared in recent searches of the database. The food data processing engine further causes the system to create a new food record comprising the standardized description, associate the new food record to a cluster of food records, the cluster comprising a plurality of food records identified as being descriptive of a same food item, and designate the new food record as a candidate record representative of the cluster based on a result of the determination of the score.

In at least one embodiment, a method of modifying a food record database is disclosed. The method comprises receiving a plurality of food records from a plurality of sources, each of the plurality of food records comprising at least a food record description, the plurality of sources including (i) at least one non-user entity that is an owner of a third party food database, and (ii) users of the food record database. The method further comprises receiving search requests from the users of the food record database, and returning one or more top search results from the food record database in response to each of the search requests, wherein the one or more top search results identify a limited number of food records in the database that have food record descriptions which are most closely associated to a food description entered in the search request. The method also comprises determining a score for a particular food record identified by the top search results, wherein the score is calculated based at least in part on one of: a number of times the particular food record has been included in the top search results of the search requests or a number of times the particular food record has been logged. When the score is greater than a predetermined threshold, amend the particular food record to include a designation of the particular food record as a candidate record representative of a cluster of food records in the database.

In yet another embodiment of the disclosure, a non-transitory computer-readable medium comprising one or more instructions, which when executed by the processor, causes the processor to receive a request to search a food database, the database comprising a plurality of food records, the food records received from a plurality of sources, each of the plurality of food records comprising at least a name and nutrition data relating to one of a plurality of foods, wherein the plurality of sources comprises (i) at least one non-user entity that is an owner of a third party food database, and (ii) a plurality of users. In response to the request, the system accesses the database to identify one or more food records that are most closely associated with the search request based at least in part on a level of similarity between words entered in the search request and the respective food record names. The system further determines a score for each of the identified one or more food records, wherein the score is calculated based at least in part on one of: a number of times each of the identified one or more food records has been logged or a number of times each of the identified one or more food records has appeared in prior searches of the database. Thereafter, the system returns a list of the identified one or more food records, the list including at least one designator configured to indicate a particular one of the identified one or more food records which was determined to have a highest score.

The above described features and advantages, as well as others, will become more readily apparent to those of ordinary skill in the art by reference to the following detailed description and accompanying drawings. While it would be desirable to provide food description processing methods and apparatuses that provide one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DESCRIPTION

Figure 1:
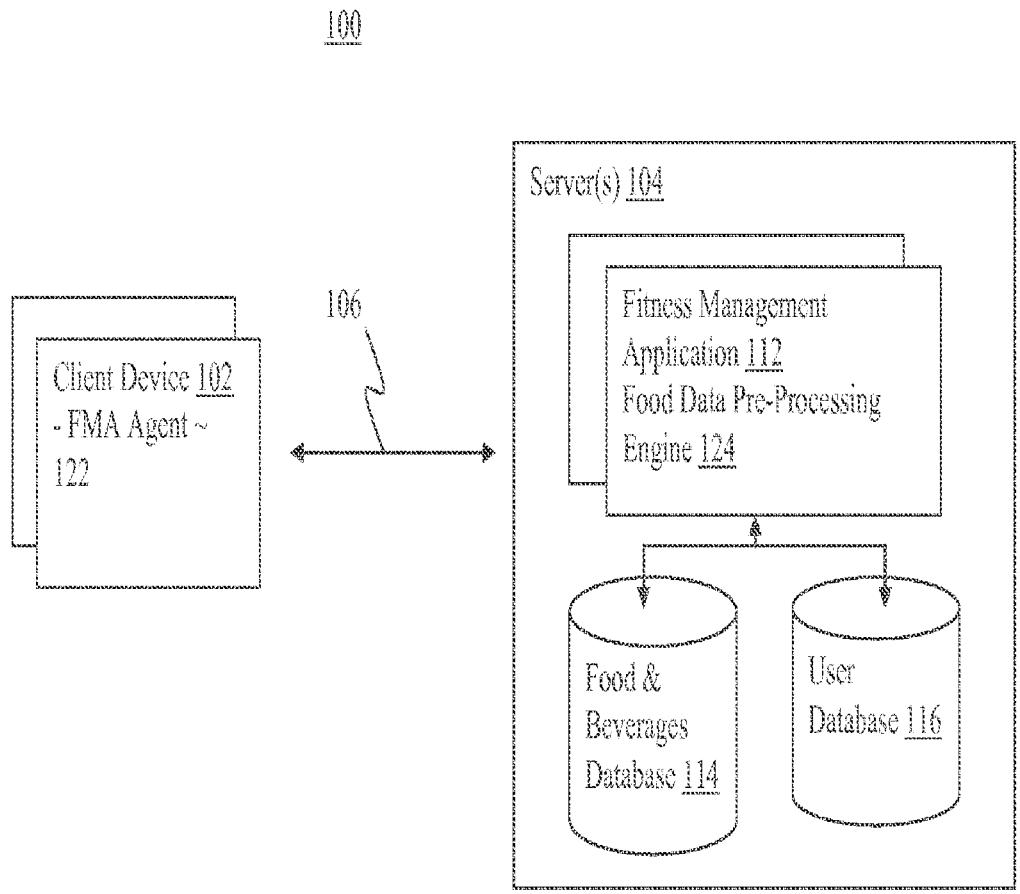
FIG. 1 illustrates a fitness management system suitable for practicing the present disclosure, according to the various embodiments.

Disclosed embodiments include apparatuses, methods and storage media associated with food description processing.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Referring now to FIG. 1, wherein a fitness management system, according to the various embodiments, is illustrated. As shown, fitness management system (FMS) 100 may include any number of client devices (e.g., client device 102) and one or more server(s) 104 coupled with each other. Server(s) 104 may host a fitness management application (FMA) 112, including a number of databases, e.g., food and beverages database 114 and user database 116, configured in accordance with the teachings of the present disclosure. Whereas client device 102 may include a client side agent 122 of FMA 112 configured to access and interact with FMA 112, to enable a user of the client device 102, among other things, to develop a fitness plan that may include a nutritional, or food and beverage, budget, and monitor the progress towards meeting the fitness plan. For example, a user may develop a fitness plan including a caloric budget designating a number of calories the user would like to consume in a day. For those attempting to lose weight the designated number of calories may be a maximum number the user may like to stay below, while, for those looking to gain weight, the designated number of calories may be a minimum number of calories the user may like to stay above. In some embodiments, the user may be able to further designate the nutritional sources for these calories. For example, if a user would like to limit the user's caloric intake from fat, the user may designate a maximum budget of the user's calories from fat. As another example, if the user is looking to gain or maintain muscle mass the user may designate a minimum budget of the user's caloric intake that should come from proteins.

Once such a fitness plan is developed, the user may utilize client side agent 122, in conjunction with FMA 112, to monitor the user's intake of foods and/or beverages. This may be accomplished by the user entering individual food and/or beverage items that the user consumes along with quantities of these food and/or beverage items consumed. In some instances the food and/or beverage item may already have a food record in food and beverages database 114. In such instances, the user may merely select the food and/or beverage item from a list of food and/or beverage items and then enter quantity consumed. FMA agent 122, in conjunction with FMA 112, may then be configured to incorporate the consumption of the food and/or beverage item into the user's nutritional budget based upon a description of the food item in the food record of the food and beverages database 114. Such a food record may include nutritional information, such as that discussed below. In some instances the food and/or beverage item may not have an existing record, or the user may not be able to find the appropriate food record for the food and/or beverage item. In such instances, the user may enter the information that the user knows about the food including a food identifier, brand name, country of origin, a description including any nutritional information the user knows, and any additional description the user would like to enter for the food. Such information may then be incorporated into the user's nutritional budget as well as incorporated into food and beverages database 114.

In embodiments, server(s) 104, except for FMA 112 and databases 114-116, may be any one of a number of computer servers, real or virtual, known in the art, including, but not limited to, servers available from Dell Computing of Austin, Tex. or Hewlett Packard of Palo Alto, Calif. In embodiments, FMA 112 may include food data pre-processing engine 124, hereinafter referred to simply as "pre-processing engine 124." Whereas food & beverages database 114 may include food and beverage items, including a description of the food and beverage items that may include nutrient information associated with the food and beverage items, as well as recipes and ingredient items. Examples of nutrient information may include, but are not limited to, amounts of protein; sugar; various fats, including trans-fat, saturated fat, etc.; sodium; carbohydrates, both complex and simple; calcium, various vitamins and/or calories per serving. In some embodiments, server(s) 104 may represent a cloud computing environment where each of FMA 112, pre-processing engine 124, food and beverages database 114, and user database 116 may reside, individually or in any combination, on servers, real or virtual, of the cloud computing environment.

As discussed above, in some embodiments, a user may enter information regarding a food and/or beverage item to be incorporated into the user's nutritional budget. This user entered information may also be incorporated into food and beverages database 114 and may enable food and beverages database 114 to grow through user entered information. Such user entered information may be referred to as crowd-sourced information. A problem with this user entered information is that it may not be formatted in a manner consistent with other food records contained within food and beverages database 114. In some embodiments, such inconsistently entered information may result in a number of duplicate food records for the same food and/or beverage item. In addition, the inconsistency of the information may make it difficult for a user to find a specific food and/or beverage item that is contained within the database, and, as a result, the user may enter duplicate, or nearly duplicate, information and lose any efficiency that would be gained by utilizing the previously entered information. To combat such inconsistently entered food and/or beverage information, pre-processing engine 124 may be configured to process the user entered food and/or beverage information to standardize and/or normalize the information before entry of the information as a food record in food and beverages database 114.

In embodiments, client device 102 may be any one of a number of stationary or portable electronic devices known in the art, including, but not limited to, desktop computers (e.g. those available from Dell Computing of Austin, Tex.), smartphones, computing tablets, laptop computers, electronic readers, personal digital assistants, and so forth, such as Galaxy S4 from Samsung Electronics of Seoul, Korea, or iPad from Apple Computer of Cupertino, Calif. In embodiments, one or more portable computing devices 102 may be a wearable computing device, e.g., a smart watch, smart eyeglasses (e.g., Google Glass from Google of Mountain View, Calif.), and so forth. In embodiments, FMA agent 122 may be a web-based application configured to operate in a generic browser, such as Internet Explorer, available from Microsoft Corp., of Redmond, Wash., or Safari from Apple Computer of Cupertino, Calif. In other embodiments, FMA agent 122 may be a stand-alone client side application, e.g., a mobile app configured to run on a smartphone such as, for example, a mobile app available through the App Store from Apple Computer of Cupertino, Calif.

In embodiments, client device 102 and server(s) 104 may be communicatively coupled with one another via communication link 106 over one or more wired and/or wireless, private and/or public networks, including the Internet. Client device 102 and server(s) 104 may be configured with the appropriate networking communication interfaces. An example of a wired communication interface may include, but is not limited to, Ethernet, while examples of wireless communication interfaces may include, but are not limited to, near field communication (NFC), Bluetooth, WiFi, 4G or 5G LTE. In between the communication interfaces of client devices 102 and server(s) 104 may be any number of gateways, routers, switches, based stations, and so forth.

Hereinafter, for ease of description, including the claims, the term "food" will be used to mean "food and/or beverage," unless the context clearly indicates otherwise.

Figure 2:
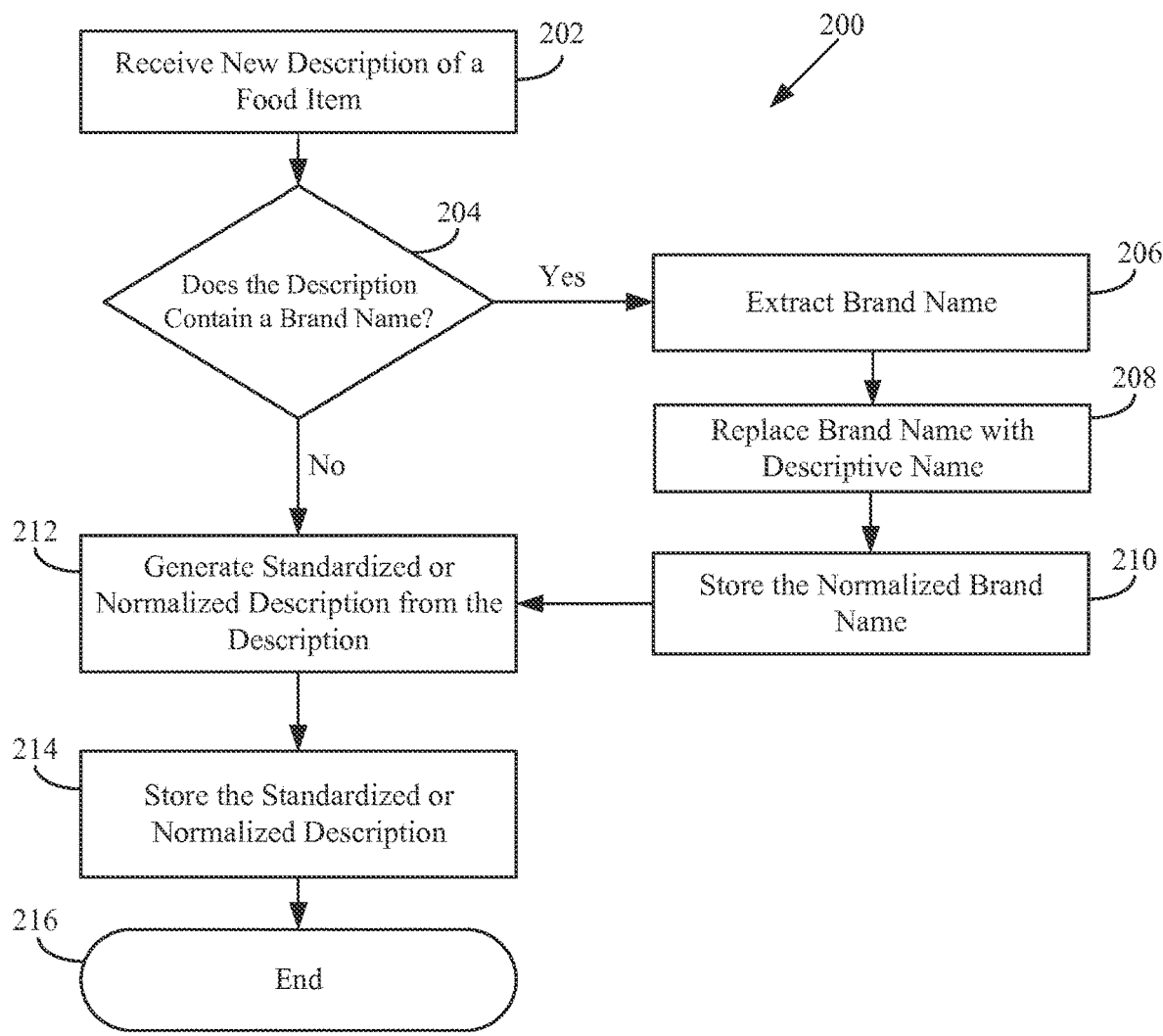
FIG. 2 illustrates example operation flow of processing a food description, according to the various embodiments.

FIG. 2 illustrates an example process flow for processing a description of a food item by pre-processing engine 124 of FIG. 1, in accordance with various embodiments of the present disclosure. The process flow may begin at block 202 where the description of the food item may be received by the pre-processing engine. Such a description may be received by the pre-processing engine, for example, from FMA agent 122 of client device 102 of FIG. 1 via communication link 106 of FIG. 1. As discussed above in reference to FIG. 1, the description may be entered by a user of computing device 102, for example, to describe a food and/or beverage item that the user consumed to be incorporated into a fitness plan the user developed.

In some embodiments, at block 204 the pre-processing engine may analyze the description to determine whether the description contains a brand name. This may be accomplished by the pre-processing engine tokenizing the description, including any brand name the description may contain. As used herein, tokenizing may refer to the process of dividing the text of the description into smaller components, or tokens, to be processed. The tokens may be individual characters, words, groups of words (e.g., every three words), or groups of characters (e.g., every five characters).

Once the description has been tokenized it may be processed by the pre-processing engine to standardize the description. This may be accomplished, for example, by the pre-processing engine removing special characters, spaces, etc. from the description. A list of normalized brand names, which may be stored, for example, as a table in the food and beverages database, may then be retrieved by the pre-processing engine which may then tokenize and standardize the list of normalized brand names in the same manner as the description. Standardizing the list of normalized brand names in the same manner as the description may enable a more accurate search of the description for the normalized brand names. In some embodiments, each brand name in the list of normalized brand names may also have commonly used non-normalized brand names associated therewith. For example, if the normalized brand name is McDonald's, then the non-normalized brand names associated therewith may be Mcdonalds, McDonalds, McDonald, etc. In such embodiments, the non-normalized brand names may also be standardized in the same manner as the normalized brand names.

Once the description, normalized brand names, and, in some embodiments, the non-normalized brand names associated with the normalized brand names, have been tokenized and standardized, the individual tokens of the normalized and non-normalized brand names may be searched to determine whether the description contains a brand name (e.g., through a hashing process). If an exact match to one of the normalized or non-normalized brand names is not found, then, in some embodiments, the process may proceed to determine if a brand name within a threshold of similarity is contained within the description. This procedure may also result in the correction of brand names that may be misspelled by the user. For example, misspelled brand "P. F. Chnag's" will fall within the threshold of similarity of the brand "P. F. Chang's", and may be corrected in the process. The threshold of similarity may, in some embodiments, be based on a Damerau-Levenshtein distance analysis which may provide a count of the number of operations it would take to transform one or more tokens of the description into one of the normalized or non-normalized brand names. Such a count may commonly be referred to as a distance, or modified edit distance, between the one or more tokens and the normalized or non-normalized brand name. If the distance between the normalized or non-normalized brand names and the one or more tokens of the description are within a predefined distance from one another, then the one or more tokens may be determined to be within a threshold of similarity to the normalized or the non-normalized brand name. In such an instance, the determination in block 204 may be in the affirmative and the process may proceed to block 206. In other embodiments, such an analysis may be accomplished using a Jaccard index, or Jaccard coefficient analysis, which may take the one or more tokens and determine a measure of the overlap. An example of such an analysis is discussed further below in reference to FIG. 3. If a brand name is not found within the description then the process may proceed to block 212.

At block 206, the one or more tokens may be extracted from the description. In some embodiments, this extraction may include the extraction of one or more additional tokens either before or after the one or more tokens of the brand name. For example, if the description states "sandwich from McDonalds" the "from" contained in the description may be extracted in addition to the brand name. In some embodiments, such additional tokens may be automatically extracted by designating that a token leading into a brand name and/or a token following a brand name are to be extracted along with the brand name. In other embodiments, the tokens before and after the brand name may be analyzed to determine if the word is a common leading or trailing word (e.g., a preposition) to be extracted. Such common leading or trailing words may be contained in a list of leading and/or trailing words stored, for example, in a table of the food and beverages database. In some embodiments, the normalized brand name that is within a threshold of similarity may be associated with the description to be recorded as the brand name for the description being processed (e.g., brand name of food record 1 of FIG. 6).

At block 208, in some embodiments, the brand name extracted from the description may be replaced with a descriptive name. For example, if the normalized brand name is "French's" the extracted brand name may be replaced with a descriptive name, such as mustard. Such a descriptive name may be associated with the normalized brand name via the table of normalized brand names, for example, discussed above. It will be appreciated, that block 208 may be optional and, as a result, may be omitted in some embodiments. At block 210, the normalized brand name may be stored, for example as part of a food record in food and beverages database 114 of FIG. 1, after which the processing may proceed to block 212. It will be appreciated that, in some embodiments, the procedures of blocks 204-210 may be optional and, as a result, may be omitted from the processing performed by the pre-processing engine.

At block 212, pre-processing engine may process the description to generate a standardized and/or normalized description for the food item. This may be accomplished by first standardizing the description of the food item for processing. Such standardization may begin by cleaning the description. Such a cleaning may include the removal of stop words designated, for example, by a list of stop words contained within a table of the food and beverages database. The cleaning may also include the removal of punctuation or special characters from the description. In addition, the cleaning process may include the removal of any unnecessary delimiters, such as, for example, removal of consecutive spaces. In some embodiments, the cleaning may also include removal of "bad" keywords that may be defined, for example, in a table of bad keywords stored in the food and beverages database. Such bad keywords may be for example, profanities, vulgarities, etc.

Once the description has undergone the above cleaning process, the description may be further standardized and/or normalized by removing any usernames from the description. As used herein, standardized may refer to standardization of a single instance of a description independent of any other description instances, while normalized may refer to normalization of a single instance with respect to other description instances contained with a set of description instances (e.g., with respect to the clusters discussed below or with respect to other records within the food and beverages database). This may be accomplished by utilizing a user database (e.g., user database 116 of FIG. 1) to construct a username dictionary to utilize in analyzing the description for any usernames. Such an analysis and removal may be performed in a similar manner to the analysis and removal of brand names described above in reference to FIG. 2. In some embodiments, the standardization may also include the analysis and removal of any country names contained within the description. Again, the removal of the country names may be performed in a similar manner to the analysis and removal of brand names described above. In some embodiments, any country name contained within the description may be stored in a country field of a food record for the description. In some embodiments, the capitalization may also be standardized as part of the standardization process. Standardizing the capitalization may involve, for example, converting all capital letters to lowercase. At block 214 pre-processing engine may cause the standardized and/or normalized description of the food item to be stored in a fitness management system, such as FMS 100 of FIG. 1. In embodiments, this may include storage of the description of the food item, the brand name of the food item, the country of the food item, and/or any other pertinent information with respect to the food item, as a food record in the food and beverages database.

Figure 3:
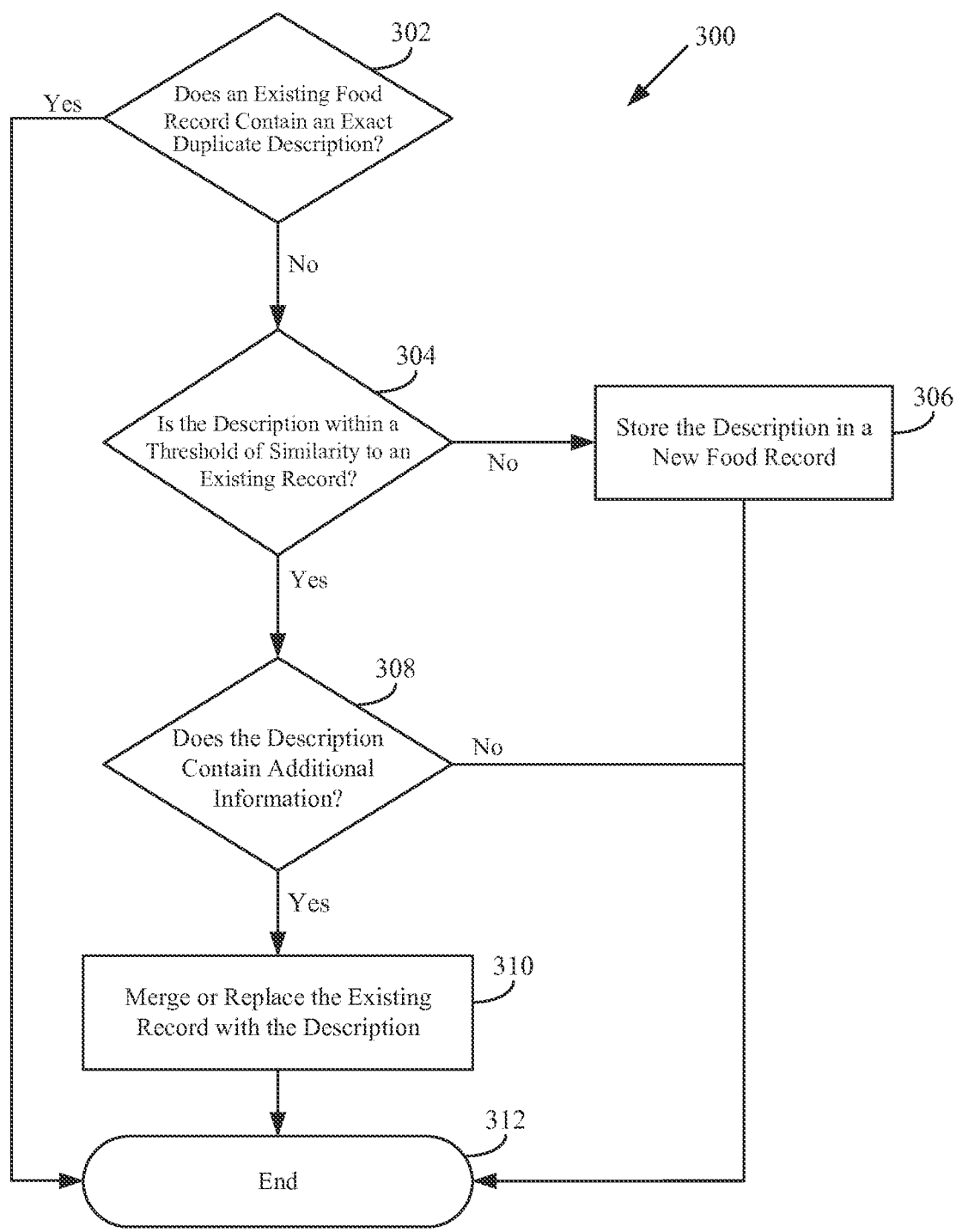
FIG. 3 illustrates an example operation flow of storing a standardized and normalized food description, according to various embodiments.

FIG. 3 illustrates an example process flow 300 store a standardized and/or normalized food description, in accordance with various embodiments of the present disclosure. In some embodiments, when storing a description of a food item, it may be desirable to determine whether a duplicate, or nearly duplicate, description for the food item already exists. This may prevent duplicate, or nearly duplicate, descriptions of the same food item from taking up unnecessary space in a storage mechanism, such as food and beverages database 114 of FIG. 1, in addition to reducing the amount of noise contained within food item search results that may be caused by duplicate, or near duplicate, records for the same food items. Process 300 depicts an illustrative process that may prevent or limit the storage of duplicate, or near duplicate, descriptions of the same food item. Such a process may be carried out as part of block 216 of FIG. 2.

Process 300 may begin at block 302 where pre-processing engine may determine whether an existing food record contains an exact duplicate description for the same food item. This may be accomplished by taking the standardized and/or normalized description and constructing n-grams (or k-shingles) from the standardized or normalized description. As used herein, n-grams may be a contiguous sequence of n items from the description. The items may be phonemes, syllables, letters, words, etc. K-shingles on the other hand, may refer to k contiguous subsequences of the n-grams. For example, consider a food item 'A' where the standardized description of food item A is "Chicken sandwich with white onions and peppers." A three shingle set for food item A may be {[Chicken, sandwich, with], [sandwich, with, white], [with, white, onions], [onions, and, peppers]}. If a food record already exists that contains an exact duplicate description, (e.g., has the exact same shingle set as food item A) then the process may proceed to block 312 where process 300 may end and the description being stored may be discarded. If an existing food record does not contain an exact duplicate description, then the process may proceed to block 304.

At block 304, pre-processing engine may determine whether an existing food record contains a description for a food item that is within a threshold of similarity of the description of the food item being processed. The threshold of similarity may, as described above in reference to the brand name analysis, be based on a Damerau-Levenshtein distance analysis which may provide a count of the number of operations it would take to transform the description being processed into a description of an existing food record. Such a count may commonly be referred to as a distance between the description being processed and the description of the existing food record. If the distance between the description being processed and the description of the existing food record are within a predefined distance from one another, then the description being processed and the description of the existing food record may be determined to be within a threshold of similarity to one another. In such an instance, the determination in block 304 may be in the affirmative and the process may proceed to block 308. In other embodiments, this may be accomplished utilizing a Jaccard index, or Jaccard coefficient analysis, which may be depicted by the equation $$J(A, B) = \frac{|A \cap B|}{|A \cup B|}.$$

where A may be the shingle set of A and B may be the shingle set of B. In such an embodiment, returning to the above example, consider a food item 'B' where the standardized description of food item B is "Chicken sandwich with onions and peppers." A three shingle set for food item B may be {[Chicken, sandwich, with], [sandwich, with, onion], [with, onions, and], [onions, and, peppers]}. Utilizing the Jaccard coefficient analysis yields $$J(A, B) = \frac{|A \cap B|}{|A \cup B|} = \frac{3}{6} = .5.$$

In addition, the Damerau-Levenshtein distance between food item A and food item B would be 5, because the two descriptions are identical other than the word "white" which would attribute 5 characters to the Damerau-Levenshtein distance. If the threshold of similarity is, for example, 0.4, for the Jaccard coefficient example, or, for example 8, for the Damerau-Levenshtein example, then the determination of block 304 may be in the affirmative and the processing may proceed to block 308. If, however, the determination of block 304 is in the negative, then the process may proceed to block 306 where the description, along with brand, country, etc. may be stored into a new food record of the food and beverages database. After the description of the food item being processed is stored at block 306, the process may proceed to block 312 where the process may end.

At block 308 pre-processing engine may make a determination as to whether the description for the food item being processed contains additional information not contained within the description of the existing record. For example, a user may have previously entered a description omitting the amount of sodium contained within a serving of the food item and the description being processed may contain this information. If the description for the food item being processed does not contain additional information, then the process may proceed to block 312 where the process may end. If, however, the description for the food item being processed does contain additional information, then the process may proceed to block 310 where the pre-processing engine may either merge the additional information into the description contained within the existing record or replace the existing record with the description of the food item being processed. The description being processed and the description of the existing record may be merged, for instance, by incorporating the additional information contained within the description being processed into the description of the existing record. Returning to the example above, such a merge may be accomplished by adding the amount of sodium contained within the description being processed to the description of the existing record. Once procedure 310 is complete, the process may proceed to block 312 where the process may end.

Figure 4:
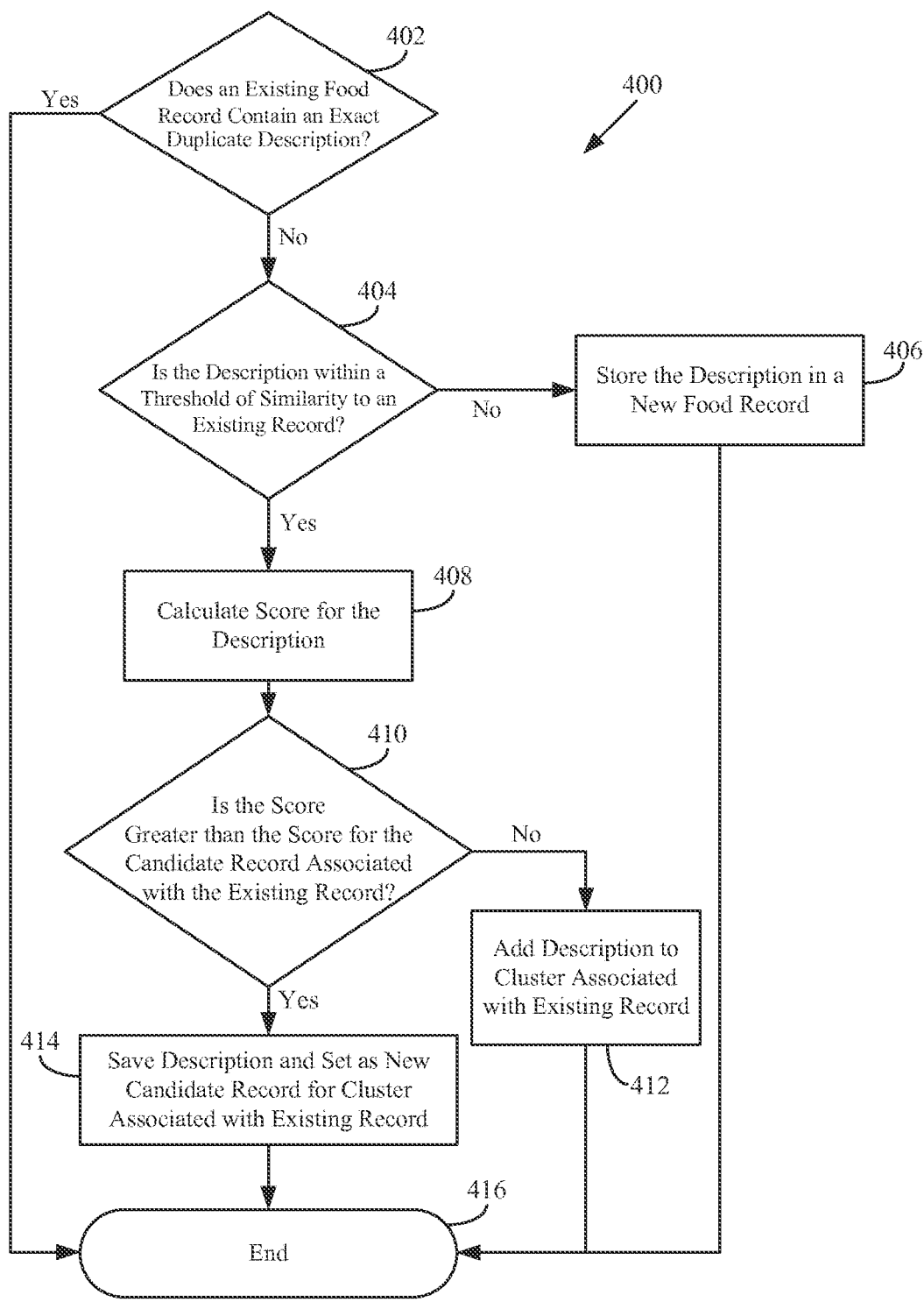
FIG. 4 illustrates another example operation flow of storing a standardized and normalized food description, according to various embodiments.

FIG. 4 illustrates another example process flow 400 of storing a standardized and normalized food description, according to various embodiments. Process flow 400 differs from process flow 300 of FIG. 3 in that records containing similar descriptions for the same food item may, in some embodiments, be organized into clusters (e.g., the clusters discussed below in reference to FIG. 5). In such embodiments, exact duplicates of existing food records may still be discarded, however, a new food description that is within a threshold of similarity to a description of an existing food record may be added to a cluster associated with the existing food record. Such an embodiment is discussed in further detail below.

Process 400 may begin at block 402 where pre-processing engine may determine whether an existing food record contains an exact duplicate description for the same food item. This may be accomplished in a similar manner to that described above in reference to process 302 of FIG. 3. If a food record already exists that contains an exact duplicate description, then the process may proceed to block 416 where process 400 may end and the description being stored may be discarded. If an existing food record does not contain an exact duplicate description, then the process may proceed to block 404.

At block 404, pre-processing engine may determine whether an existing food record contains a description for a food item that is within a threshold of similarity of the description of the food item being processed. As discussed above in reference to FIG. 3, the threshold of similarity may, in some embodiments, be based on a Damerau-Levenshtein distance analysis which may provide a count of the number of operations it would take to transform the description being processed into a description of an existing food record. Such a count may commonly be referred to as a distance between the description being processed and the description of the existing food record being processed. If the distance between the description being processed and the description of the existing food record are within a predefined distance from one another, then the description being processed and the description of the existing food record may be determined to be within a threshold of similarity one another. In such an instance, the determination in block 404 may be in the affirmative and the process may proceed to block 408. If, however, the determination of block 404 is in the negative, then the process may proceed to block 406 where the description, along with brand, country, etc. may be stored into a new food record of the food and beverages database. After the description of the food item being processed is stored at block 406, the process may proceed to block 416 where the process may end.

At block 408, a score for the description being processed may be determined. Such a score may be based on any factor that may be utilized to prioritize the description being processed. For example, the score may be based on additional information contained within the description being processed; the number of times the description being processed has been logged by a user; a measure of reliability of the source of the description (e.g., if the description were acquired from the FDA); the number of times the description being processed has appeared in the top results of recent searches, etc. Once a score for the description has been determined the process may proceed to block 410.

At block 410, a determination may be made as to whether the score calculated at block 408 is greater than the score of the current candidate record for the cluster associated with the existing record having a description within a threshold of similarity with the description being processed. If the score of the description being processed is less than, or equal to, the score of the current candidate record, then the process may proceed to block 412 where the description being processed, along with country, brand name, etc. may be added as a new record to the cluster. If, however the score of the description being processed is greater than the score of the current candidate record, then the process may proceed to block 414 where the description being processed, along with country, brand name, etc. may be added as a new record to the cluster and the new record may be set as the new candidate record for the cluster. Once the processing at block 414 has concluded, the process may proceed to block 416 where the process may end.

Figure 5:
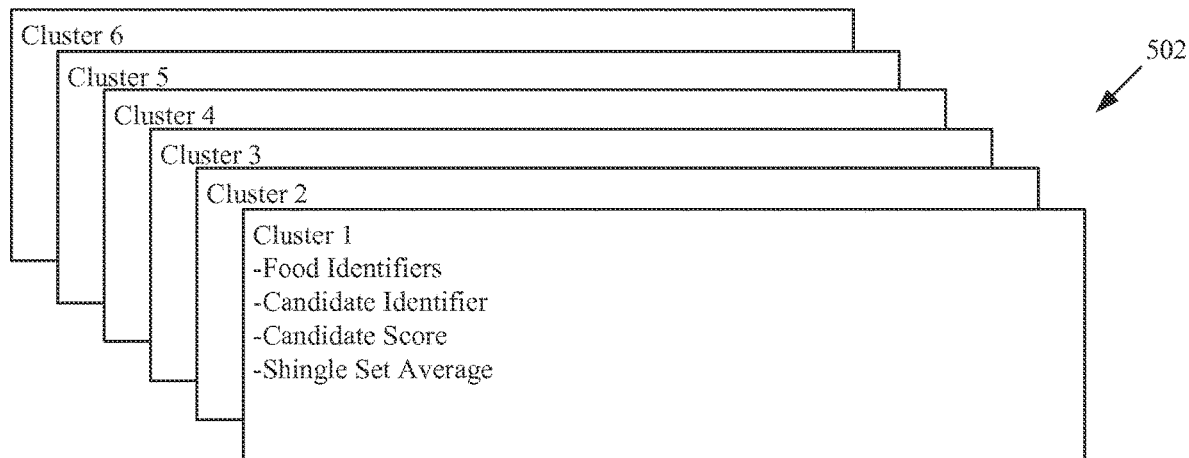
FIG. 5 illustrates example cluster records, according to the various embodiments.

FIG. 5 illustrates example cluster records 502 for clusters 1-5 in accordance with various embodiments of the present disclosure. As depicted, each cluster record may include a number of food identifiers to identify the records associated with the cluster. Each cluster may also include a candidate identifier that may identify the current candidate record associated with the cluster. In addition, the cluster record may, in some embodiments, include a score of the current candidate, such as the score discussed above in reference to FIG. 4. In addition, the cluster may, in some embodiments, include a count for the average shingle set of the various food records associated with the cluster.

Figure 6:
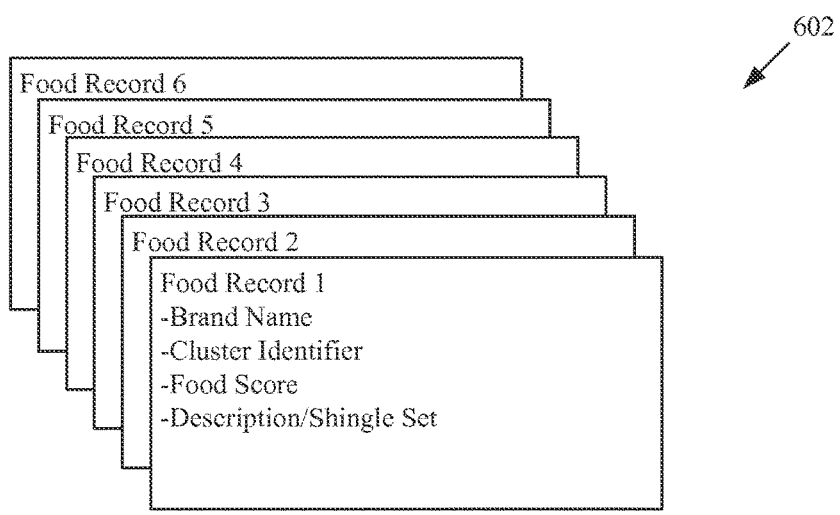
FIG. 6 illustrates example food records, according to various embodiments.

FIG. 6 illustrates example food records 1-6, in accordance with various embodiments of the present disclosure. As depicted, each food record 602 may include a brand name associated with the food record. In some embodiments, the food record may also include a cluster identifier that may identify the cluster to which the food record is associated. In some embodiments, the food record may also indicate a score associated with the food record, such as the score described above in reference to FIG. 4. Finally, each food record may include a description and or a shingle set associated with the food record, such as the shingle set discussed in reference to FIG. 4, above.

Figure 7:
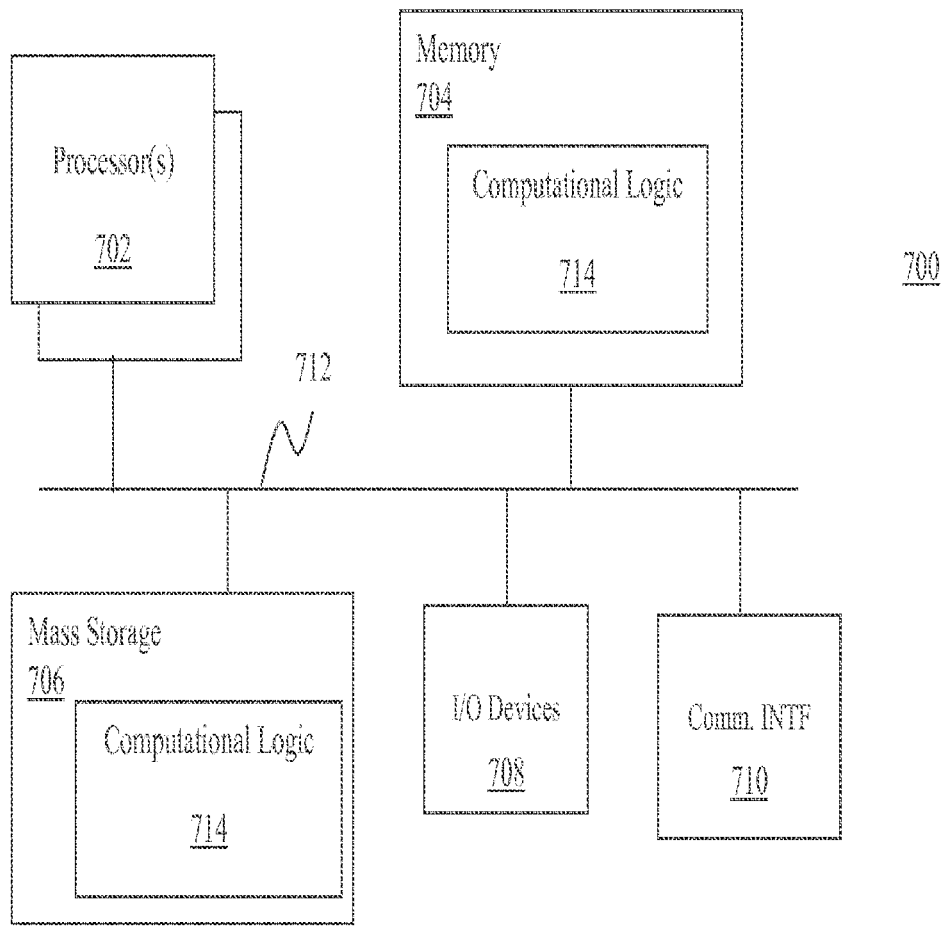
FIG. 7 illustrates an example computing system suitable for use as an interactive messaging computing device or a portable client device, according to various embodiments.

Referring now to FIG. 7, wherein an example computer suitable for use as server(s) 104 or client device 102 of FIG. 1, in accordance with various embodiments, is illustrated. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control and so forth) and communication interfaces 710 (such as network interface cards, modems and so forth). The elements may be coupled to each other via system bus 712, which may represent one or more buses. In the case of multiple buses, the buses may be bridged by one or more bus bridges (not shown).

Each of these elements may perform its conventional functions known in the art. In particular, when used as server(s) 104, system memory 704 and mass storage devices 706 may be employed to store a working copy and a permanent copy of the programming instructions implementing the operations associated with fitness management application 112 and pre-processing engine 124 of FIG. 1, above, collectively referred to as computational logic 722. The various elements may be implemented by assembler instructions supported by processor(s) 702 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary, depending on whether computer 700 is used as server(s) 104 or client device 102. When used as client device 102, computing device 700 may be a smartphone, computing tablet, e-reader, ultrabook, or laptop. Otherwise, the constitutions of elements 710-712 are known, and accordingly will not be further described.

Figure 8:
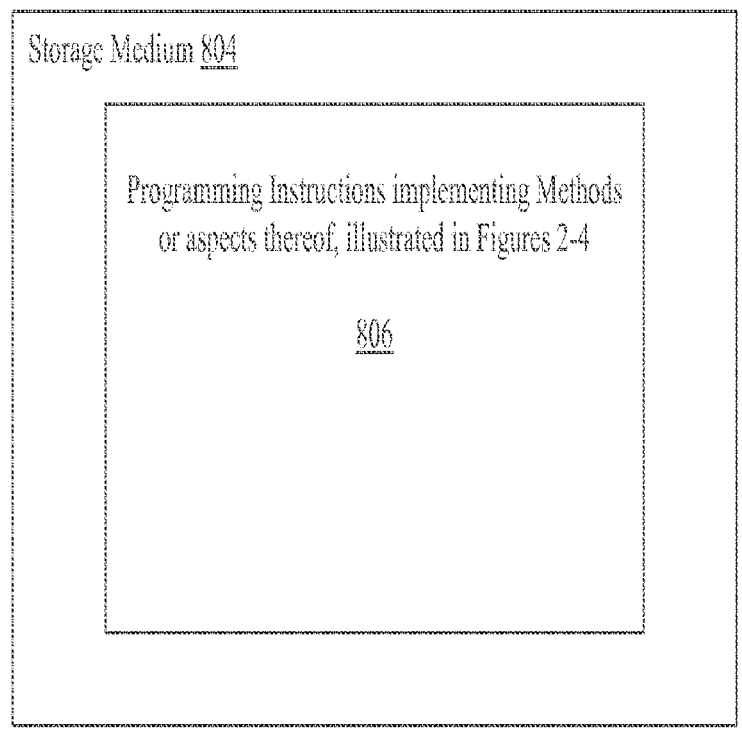
FIG. 8 illustrates an example storage medium having instructions to cause a computing device to practice aspects of interactive messaging, according to various embodiments.

FIG. 8 illustrates an example computer-readable non-transitory storage medium having instructions configured to practice all or selected ones of the operations associated with earlier described fitness management application 112 and/or preprocessing engine 124 of FIG. 1, in accordance with various embodiments. As illustrated, non-transitory computer-readable storage medium 802 may include a number of programming instructions 804. Programming instructions 804 may be configured to enable a device, e.g., computer 800, in response to execution of the programming instructions, to perform, e.g., various operations of the processes described above in reference to FIGS. 1-4, e.g., but not limited to, the operations associated with pre-processing engine 124. In alternate embodiments, programming instructions 804 may be disposed on multiple computer-readable non-transitory storage media 802 instead. In alternate embodiments, programming instructions 804 may be disposed on computer-readable transitory media 802, such as, signals.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A system comprising:
    a database comprising a plurality of food records including (i) one or more official food records comprising data obtained from a third party food database and (ii) one or more food records comprising data provided by users of the system, wherein each of the food records comprises at least a description of a food item;
    one or more processors; and
    a food data processing engine, which, when operated by the one or more processors, amends at least one of the food records in the database by causing the system to:
        standardize the at least one food item description of the at least one food record;
        determine a score associated with the at least one food record, wherein the score is calculated based at least in part on one of: a number of times the at least one food record has been logged or a number of times the at least one food record appeared in recent searches of the database;
        create a new food record comprising the standardized description;
        associate the new food record to a cluster of food records, the cluster comprising a plurality of food records identified as being descriptive of a same food item; and
        designate the new food record as a candidate record representative of the cluster based on a result of the determination of the score.

2. The system of claim 1, wherein the score associated with the at least one food record is calculated based in part on a score for the standardized food item description of the food record.

3. The system of claim 2, wherein the score for the standardized food item description is based in part on at least one of: a measure of reliability of a source of the description or information contained within the description.

4. The system of claim 1, wherein the food data processing engine is further configured to cause the system to display a list of food records from the cluster of food records.

5. The system of claim 4, wherein the food data processing engine is further configured to associate an identifier with the candidate record and display the identifier with the candidate record in the list of food records.

6. The system of claim 4, wherein the food data processing engine is further configured to move the candidate record to a top of the list of food records.

7. The system of claim 1, wherein standardizing the at least one food item description includes:
    division of the food item description into a plurality of component words;
    elimination of unnecessary ones of the plurality of component words; and
    standardization of remaining ones of the plurality of component words via removal of special characters or features therefrom.

8. The system of claim 7, wherein at least one of the component words comprises a brand name and the standardization comprises causing the description to match a description provided by a brand owner.

9. The system of claim 1, wherein the third party database is provided by at least one of a government agency, a consumer product company, and a food data organization, and wherein the one or more food records comprising data provided by users of the system are crowd-sourced food records.

10. The system of claim 1, wherein food includes beverage such that the plurality of food records include beverage records.

11. A method of modifying a food record database, the method comprising:
    receiving a plurality of food records from a plurality of sources, each of the plurality of food records comprising at least a food record description, the plurality of sources including (i) at least one non-user entity that is an owner of a third party food database; and (ii) users of the food record database;
    receiving search requests from the users of the food record database;
    returning one or more top search results from the food record database in response to each of the search requests, wherein the one or more top search results identify a limited number of food records in the database that have food record descriptions which are most closely associated to a food description entered in the search request;
    determining a score for a particular food record identified by the top search results, wherein the score is calculated based at least in part on one of: a number of times the particular food record has been included in the top search results of the search requests or a number of times the particular food record has been logged; and
    when the score is greater than a predetermined threshold, amend the particular food record to include a designation of the particular food record as a candidate record representative of a cluster of food records in the database.

12. The method of claim 11, wherein the score is further calculated based in part on a score for a standardized food item description of the particular food record.

13. The method of claim 12, wherein the score for the standardized food item description is based in part on at least one of: a measure of reliability of a source of the description or information contained within the description.

14. The method of claim 11, further comprising displaying the designation with the candidate record in a list of food records and moving the candidate record to a top of the list of food records.

15. The method of claim 11, wherein the non-user entity is at least one of a government agency, a consumer product company, and a food data organization.

16. A non-transitory computer-readable medium comprising one or more instructions, which when executed by the processor, causes the processor to:

receive a request to search a food database, the database comprising a plurality of food records, the food records received from a plurality of sources, each of the plurality of food records comprising at least a name and nutrition data relating to one of a plurality of foods, wherein the plurality of sources comprises (i) a plurality of users of a health tracking system, and (ii) at least one owner of a third party food database that is a non-user of the health tracking system;

in response to the request, access the database to identify one or more food records that are most closely associated with the search request based at least in part on a level of similarity between words entered in the search request and the respective food record names;

determine a score for each of the identified one or more food records, wherein the score is calculated based at least in part on one of: a number of times each of the identified one or more food records has been logged or a number of times each of the identified one or more food records has appeared in prior searches of the database; and returning a list of the identified one or more food records, the list including at least one designator configured to indicate a particular one of the identified one or more food records which was determined to have a highest score.

17. The computer-readable medium of claim 16, wherein the one or more instructions are further configured to, when executed by the processor, cause the processor to amend the particular one of the identified one or more food records to include the designator.

18. The computer-readable medium of claim 16, wherein the score for each of the identified one or more food records is calculated based in part on a score for a standardized food item description of the food record.

19. The computer-readable medium of claim 16, wherein the score for each of the identified one or more food records is based in part on at least one of: a measure of reliability of a source of the description or information contained within the description.

20. The computer-readable medium of claim 16 wherein the at least one owner of the third party database is at least one of a government agency, a consumer product company, and a food data organization.

* * * * *